Dec. 19, 1967  L. E. HARRISON  3,358,949
WING FLAP CONTROL DEVICE FOR AIRCRAFT
Filed Nov. 17, 1965  2 Sheets-Sheet 1
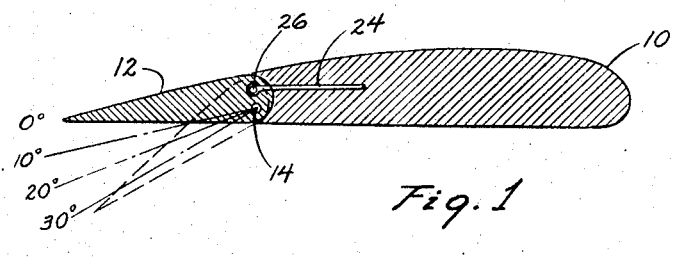
Fig. 1
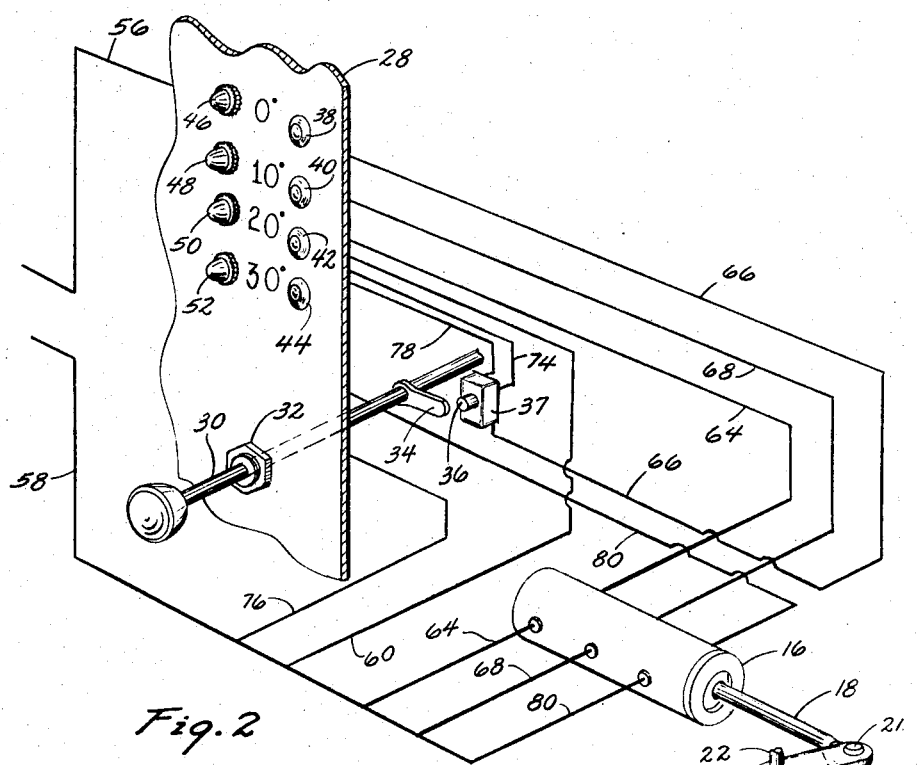
Fig. 2
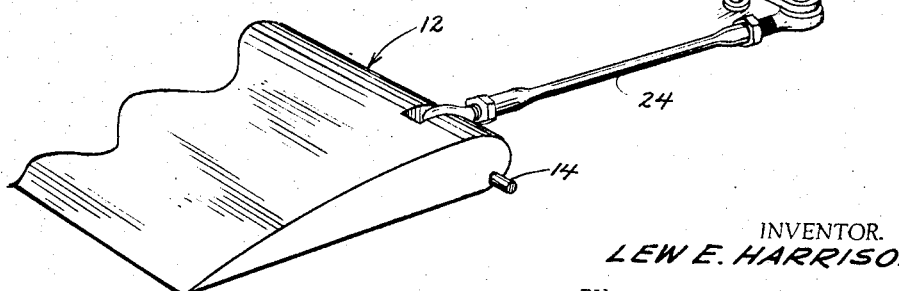
INVENTOR.
LEW E. HARRISON
BY *Dick, Zarley, McKee & Thomte*
ATTORNEYS

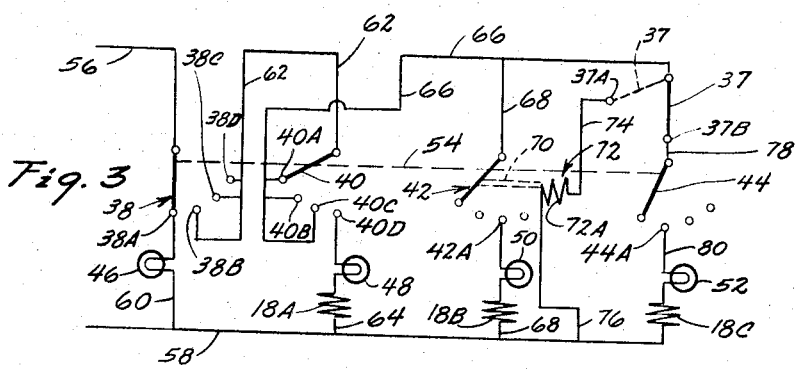
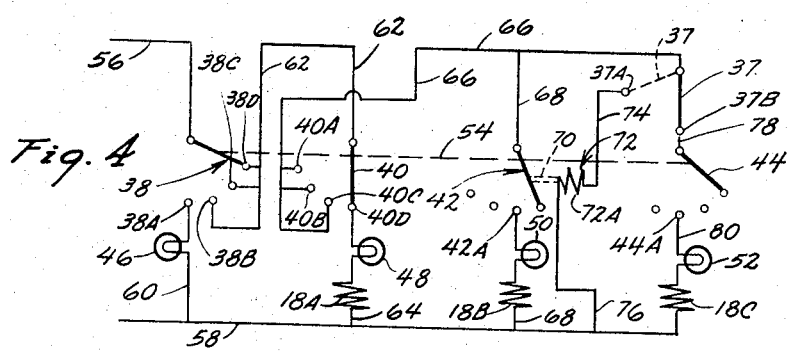
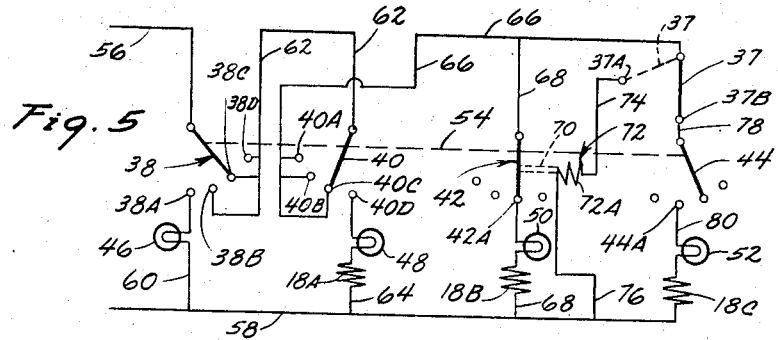
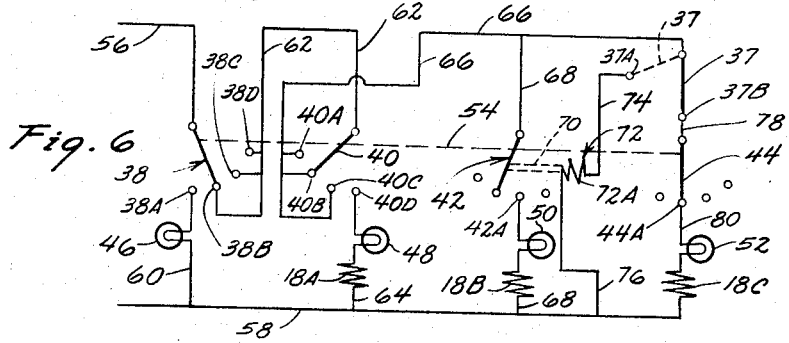

United States Patent Office 3,358,949
Patented Dec. 19, 1967

3,358,949
WING FLAP CONTROL DEVICE FOR AIRCRAFT
Lew E. Harrison, Nashua, Iowa 50658
Filed Nov. 17, 1965, Ser. No. 508,327
4 Claims. (Cl. 244—83)

ABSTRACT OF THE DISCLOSURE

A wing flap control device for aircraft having four switches, each of said switches upon activation causing activation of a solenoid which moves the wing flaps to one of four predetermined positions. A micro switch is connected to the device and is adapted to be activated upon movement of the throttle to a full power position thereupon causing activation of said solenoid to move the flaps to a position giving greatest lift to the aircraft.

---

The present invention relates to airplane flap controls and more particularly to a power operated flap control whereby the pilot of an airplane can position the flap to an exact predetermined angle with a minimum of attention, and whereby the position of the flap will automatically assume a predetermined position upon the actuation of certain other related components of the airplane.

Aircraft characteristically utilize flap structures at the trailing edges of the wings for the alternate purposes of inducing greater lift to the aircraft, and for the second purpose of reducing the speed of the aircraft. The wing flaps of some airplanes are manually operated, but most are electrically operated. However, the design of most aircraft requires that the pilot visually examine the position of the wing flap from his location in the cockpit. This obviously diverts the pilot's attention from other matters in the cockpit, and thus invites a safety hazard. The positioning of the flaps on most aircraft also requires some attention and action from the pilot in the cockpit aside from his having to visually observe the movement of the flaps.

The flaps of an aircraft normally add to the lift created by the wing structure when the flaps are diverted downwardly from a "horizontal" position of alignment with the wing to a downward angular position of approximately 20 degrees. However, when the wing flaps are pivoted downwardly from the wing structure at an angle in excess of 20 degrees, and normally between an angle of 20 to 30 degrees, the wing flap serves to de-accelerate the aircraft, and it is in this latter position that the wing flaps are normally positioned during landing conditions. Obviously, the flaps assume a position between zero and 20 degrees at times when additional lift is needed for take-off procedures.

Good landing procedures always require that the pilot have one hand on the throttle control of the aircraft and the other hand on the control wheel. Thus, when a pilot is landing an aircraft with the flaps down in the "braking" position, and when an obstruction appears on the runway, or some other event takes place which causes the pilot to abort the landing and regain altitude, the pilot must somehow cause the landing flaps to be moved from the landing or braking position between 20 and 30 degrees to the maximum lift position at 20 degrees or less. Failure to successfully change the position of the flaps during an abortive landing often results in tragedy.

Therefore, a principal object of this invention is to provide a wing flap control device for aircraft which will permit the pilot to move the wing flaps to a predetermined position without having to visually observe the movement of the wing flaps.

A further object of this invention is to provide a wing flap control device for aircraft which will automatically cause the wing flap to go from a "brake" position to a position of maximum lift whenever the throttle control is moved to a position of full power, which represent the normal conditions encountered when an abortive landing is taking place.

A still further object of this invention is to provide a wing flap control device for aircraft wherein the pilot can easily determine the precise position of the wing flaps by a suitable indicator on the control panel.

A still further object of this invention is to provide a wing flap control device for aircraft which is economical of manufacture, durable in use, and reliable in operation.

These and other objects will be apparent to those skilled in the art.

This invention consists in the construction, arrangements, and combination, of the various parts of the device, whereby the objects contemplated are attained as hereinafter more fully set forth, specifically pointed out in the claims, and illustrated in the accompanying drawings, in which:

FIGURE 1 is a sectional view through a typical aircraft wing showing the wing flap pivotally connected to the trailing edge of the wing;

FIGURE 2 is a schematic perspective view of the electrical control system wherein the flap of the aircraft is operated according to this invention;

FIGURE 3 is a schematic diagram of the various electrical components of this invention when the wing flap is in its aligned position at zero degrees;

FIGURE 4 is a drawing similar to that of FIGURE 3, but shows the positions of the electrical components assumed when the wing flaps have been pivoted downwardly to a position of 10 degrees;

FIGURE 5 is a view similar to those of FIGURES 3 and 4, but shows the electrical components in the positions when the wing flap is pivoted downwardly to a position of 20 degrees; and FIGURE 6 is a view similar to FIGURES 3–5, but shows the positions of the electrical components when the wing flaps have been pivoted downwardly to a position of 30 degrees.

The numeral 10 generally designates a conventional wing structure of an aircraft with a conventional wing flap 12 pivotally secured thereto by pivot means 14. Said aircraft is a conventional aircraft having a body and a power plant for propelling said aircraft. (Not shown in drawing.) A conventional solenoid motor 16, which is normally mounted in the wing, provides the power means for pivoting the wing flap 12 to various predetermined positions. The solenoid motor is of conventional construction and utilizes a spring to hold plunger 18 in its retracted position. The solenoid motor 18 contains three independently operating coils 18A, 18B and 18C, which, when electrically excited, serve to progressively extend the plunger 18 a greater distance out of the solenoid motor 16. As will be described hereafter, the excitement of the coil 18A will move the wing flap from a position of zero deflection to the angular position of 10 degrees; the individual excitement of the coil 18B will cause the wing flap to assume a position of 20 degrees; and the electrical excitement of the coil 18C will cause the wing flap to be moved to a position of maximum deflection at 30 degrees. An L-shaped crank 20 is pivotally secured by one of its ends to the outer end of plunger 18 by means of pin 21. The crank 20 is pivoted at its center by shaft 22 which in turn can be secured to the wing structure in conventional fashion. The other end of crank 20 is pivotally secured by pin 23 to the end of connecting rod 24. Connecting rod 24 is in turn pivotally secured by pin 26 to the upper portion of wing flap 12. The outward movement of plunger 18 from solenoid motor 16 causes crank 20 to pivot on shaft 22, which in turn causes connecting rod 24 to move over the pivot point 14 of the wing flap, whereupon the wing flap is caused to move to the various positions of deflection shown in FIGURE 1.

A conventional airplane control panel 28 is shown in FIGURE 2, and conventional throttle control linkage 30 slidably extends through a bearing 32 in the control panel. A finger 34 is rigidly secured to the throttle control linkage 30, and finger 34 is adapted to engage the plunger 36 of microswitch 37 when the throttle control linkage 30 is pushed inwardly into the panel to assume a position of maximum power for the aircraft. The aircraft power plant to which the throttle control linkage is secured has not been shown, and its precise construction is not critical to this invention. The microswitch 37 is spring loaded in a closed position on one of two terminals but is moved to a closed position on a second terminal when the plunger 36 is depressed by engagement of the finger 34 on plunger 36 when the throttle control 30 is moved to a position of full power. Indicator lights 46 through 52, respectively, are operatively connected to switches 38 through 44 and are adapted to be illuminated whenever the individual switches are moved to a closed position. The switches 38 through 44 are ganged together in conventional fashion so that manual operation of any one of the switches will automatically cause all of the three remaining switches to become open. An example of this type of gang switch is the switch manufactured by General Electric Co., type CR 2940. The ganged connection of the switches has been symbolically shown in FIGURES 3 through 6 by the numeral 54.

Switch 38 is connected to line 56 which is connected to a source of electrical power, as is line 58. Switch 38 has a first terminal 38A which is connected by line 60 to line 58, and indicator light 46 is imposed in line 60. The separate terminals 38B, 38C and 38D of switch 38 are each connected to switch 40 by means of line 62.

Terminal 40D of switch 40 is connected to coil 18A of solenoid motor 16 by means of line 64, which then connects the opposite side of coil 18A to line 58. Light 48 is imposed in line 64. Terminals 40A, 40B and 40C of switch 40 are electrically secured by line 66 to switch 42.

Switch 42 is electrically secured to line 66 by line 68. Terminal 42A of switch 42 is connected to line 58 by means of line 68, and the lamp 50, and the coil 18B of solenoid motor 16 is imposed in line 68. The plunger 70 of solenoid 72 is operatively secured to switch 42 so that whenever the coil 72A of solenoid 72 is energized, switch 42 will close on terminal 42A. One side of coil 72A is connected to terminal 37A of switch 37 by line 74, and the other side of coil 72A is connected to line 58 by means of line 76.

Terminal 37B of switch 37 is connected to switch 44 by line 78. Terminal 44A of switch 44 is secured to line 58 by line 80, and lamp 52 and coil 18C of solenoid motor 16 are imposed in line 80.

It should be understood that this invention is not to be limited to the precise means for inducing pivoting action to the wing flap, nor is it to be limited to means for pivoting a wing flap to only 10, 20 or 30 degrees.

The normal operation of the device of this invention is as follows. The master or ignition switch (not shown) will always cause the line 56 to be connected to a source of electrical power. When it is desired to maintain the wing flap 12 in an aligned position of zero degrees deflection, the pilot actuates switch 38 which causes it to move to a closed position on terminal 38A as shown in FIGURE 3. This removes switches 40, 42 and 44 from the energized circuit, and solenoid motor 16 remains in its static position to hold the wing flap 12 in the horizontal position shown in FIGURES 1 and 2. The indicator light 46 is illuminated so that the pilot can visually determine on his control panel that the wing flaps are in a position of zero degrees.

When it is desired to deflect the wing flap to a position of 10 degrees, the pilot actuates the switch 40 which causes the switches 38, 40, 42 and 44 to move to the respective positions shown in FIGURE 4 of the drawings, and which causes the switch 40 to close upon terminal 40D. An energized circuit is thereupon established through line 56, terminal 38D of switch 38, line 62, switch 40 and thence through line 64 back to line 58. This causes lamp 48 to become illuminated, and coil 64 of solenoid motor 16 is energized to cause the plunger 18 to be slightly extended from the motor 16, whereupon the wing flap is deflected downwardly to the predetermined 10 degree angle.

When it is desired to extend the wing flaps downwardly to an angle of 20 degrees, the switch 42 is actuated which causes the switches 38, 40, 42 and 44 to move to the respective positions shown in FIGURE 5 of the drawings. More specifically this causes switch 42 to close upon terminal 42A thereof. This in turn completes a circuit through line 56, terminal 38C of switch 38, line 62, terminal 40C of switch 40, lines 66 and 68, switch 42, and thence through line 68 back to line 58. This causes the illumination of indicator light 50 and the energization of coil 18B of solenoid motor 16. The energization of coil 18B causes the plunger 18 of the motor to be extended a greater distance which will effect the downward deflection of the wing flap to the 20 degree position shown in FIGURE 1 of the drawings.

As previously indicated, the microswitch 37 is normally and yieldably held in the closed position on terminal 37B thereof. When it is desired to move the wing flaps to the braking position (or to the 30 degree position shown in FIGURE 1), the switch 44 is actuated by the pilot which causes the switches 38, 40, 42 and 44 to assume the position shown in FIGURE 6 of the drawings. Thus, a circuit will be formed through line 56, terminal 38B of switch 38, line 62, terminal 40B of switch 40, line 66, switch 37, line 78, switch 44 and terminal 44A thereof, and thence through line 80 back to line 58. The energization of this circuit causes lamp 52 to become illuminated, and the energization of coil 18C within solenoid motor 16 creates a further extension of plunger 18 thereof, whereupon the landing flap 12 is deflected downwardly to the 30 degree angle shown in FIGURE 1 of the drawings.

In the event that the landing flaps are in the braking position shown by the 30 degree angle in FIGURE 1 of the drawings, and the throttle control 30 is in a de-accelerated position as would be the case when the aircraft was landing with its flaps down, and in the event that the pilot had to abort the landing because of an obstruction on the runway, or any other valid reason, the pilot could move the throttle control 30 to a position of full power which would cause finger 34 to engage the plunger 36 of switch 37, and this would cause the switch 37 to move from the position shown by the solid lines in FIGURE 6 to the position shown by the dotted lines. In effect, switch 37 would be moved from a closing position on terminal 37B to a closing position on terminal 37A. This would serve to divert the flow of current from switch 44 to the coil 72A of solenoid 72. The energization of coil 72A would be completed through line 76 which is connected to line 58. The energization of coil 72A would cause the plunger 70 of solenoid 72 to move switch 42 to a closed position on terminal 42A. This would cause switch 44 to be opened, and the switches 38, 40, 42 and 44 would assume again the position shown in FIGURE 5 of the drawings, whereupon the coil 18B in motor 16 would be energized to cause the flaps to move to the position of maximum lift, or the angular position of 20 degrees shown in FIGURE 1. As soon as full power was withdrawn by the throttle control 30, the finger 34 would disengage the plunger 36 of switch 37, and the spring in switch 37 would once again cause the switch 37 to close on terminal 37B which would break the power circuit to solenoid 72.

Thus, from the foregoing, it is seen that in an abortive landing with the flaps in a braking position, the pilot will not have to worry about changing the position of the flaps as full power is applied to the aircraft, for this will automatically take place. Thus, this invention is seen to achieve at least all of its stated objectives.

Some changes may be made in the construction and arrangement of my Wing Flap Control Device for Aircraft without departing from the real spirit and purpose of my invention, and it is my intention to cover by my claims, any modified forms of structure or use of mechanical equivalents which may be reasonably included within their scope.

I claim:

1. In combination with an aircraft having a body, a horizontal wing structure, wing flaps pivotally secured to said wing structure, a power plant for propelling said aircraft, and a throttle for controlling said power plant and movable between positions of reduced power and maximum acceleration, a wing flap control means, comprising, power means operatively secured to said wing flaps for pivoting said wing flaps downwardly from a position of alignment with said wing structure through a first angular increment to give said wing structure additional lift; and thence through a second and greater angular increment which serves to slow the speed of said aircraft, said control means including connecting means between said throttle and said power means to cause said power means to move said flaps from a position in said second angular increment to a position in said first angular increment only when said throttle is moved to a position of substantial maximum acceleration when said wing flaps are in a position within said second increment.

2. The combination of claim 1 wherein said control means includes means for electrically selectively moving said wing flaps to a plurality of predetermined positions within said first and second angular increments.

3. In combination with an aircraft having a horizontal wing structure, wing flaps pivotally secured to said wing structure, a wing flap control means, comprising, power means operatively secured to said wing flaps for pivoting said wing flaps downwardly from a position of alignment with said wing structure through a first angular increment to give said wing structure additional lift; and thence through a second and greater angular increment which serves to slow the speed of said aircraft, a plurality of switches electrically connected to said power means whereby the selective closing of one of said switches will move said wing flaps to a given position within said first and second increments means interconnecting said switches whereby the movement of one switch will effect a coordinated predetermined movement of all the other of said switches, and the closing of different switches will move said wing flaps to different positions within said first and second increments.

4. The combination of claim 3 wherein an indicator light is independently connected with each of said switches to become individually illuminated only when the respective switch to which each light is connected is closed.

References Cited

UNITED STATES PATENTS 2,350,751   6/1944   Gliubich _____ 244—42

ANDREW H. FARRELL, *Primary Examiner.*